United States Patent [19]

Ikeda et al.

[11] Patent Number: 4,908,555

[45] Date of Patent: Mar. 13, 1990

[54] AXIS FEEDRATE OUTPUT SYSTEM

[75] Inventors: Yoshiaki Ikeda, Hachioji; Mitsuru Kuwasawa, Kunitachi, both of Japan

[73] Assignee: Fanuc Ltd., Minamitsuru, Japan

[21] Appl. No.: 273,517

[22] PCT Filed: Jan. 22, 1988

[86] PCT No.: PCT/JP88/00045

§ 371 Date: Nov. 2, 1988

§ 102(e) Date: Nov. 2, 1988

[87] PCT Pub. No.: WO88/07229

PCT Pub. Date: Sep. 22, 1988

[30] Foreign Application Priority Data

Mar. 19, 1987 [JP]  Japan .................................. 62-64798

[51] Int. Cl.⁴ .............................................. G05B 19/18
[52] U.S. Cl. ...................................... 318/567; 318/571;
 318/572; 318/632; 364/474.35
[58] Field of Search ........................ 318/560-573,
 318/603, 608, 632, 640, 687, 696, 612-618, 628;
 364/474.01, 474.02, 474.35

[56] References Cited

U.S. PATENT DOCUMENTS

| | | | |
|---|---|---|---|
| 4,053,819 | 10/1977 | Matsumoto | 318/573 X |
| 4,330,832 | 5/1982 | Kohzai et al. | 318/571 X |
| 4,471,443 | 9/1984 | Kinoshita et al. | 318/572 X |
| 4,496,889 | 1/1985 | Fukuyama et al. | 318/565 |
| 4,502,108 | 2/1985 | Nozawa et al. | 364/474.35 |
| 4,504,772 | 3/1985 | Matsuura et al. | 318/632 X |
| 4,542,471 | 9/1985 | Inaba et al. | 318/632 X |
| 4,656,405 | 4/1987 | Kiya et al. | 364/474.02 X |
| 4,750,104 | 6/1988 | Kumamoto et al. | 318/603 X |
| 4,814,998 | 3/1989 | Aramaki | 364/474.35 X |

*Primary Examiner*—William M. Shoop, Jr.
*Assistant Examiner*—Paul Ip
*Attorney, Agent, or Firm*—Staas & Halsey

[57] ABSTRACT

An axis feedrate output system for CNC equipment which controls the position of a machining table in each axis by effecting feedrate control in accordance with a residual error between a position command and detected positional information in each axis. A current feedrate of the machining table in each axis is derived from the residual error, and a current actual feedrate of the machining table is synthesized using the current feedrate for the respective axes an output which represents the current actual feedrate of the machining table in the form of a ratio to a predetermined maximum feedrate is generated. An error register stores the residual error (servo error) between the position command for each axis from an MPU in the CNC equipment and the positional information detected by a position sensor and provides a feedrate command for effecting feedrate control. A fixed relationship between the residual error and the current feedrate in each axis is utilized to obtain the current feedrate in each axis from the residual error.

3 Claims, 2 Drawing Sheets

… … …

AXIS FEEDRATE OUTPUT SYSTEM

TECHNICAL FIELD

The present invention relates to an axis feedrate output system in CNC (Computer Numerical Control) equipment and, more particularly, to an axis feedrate output system which permits synthesization of current feedrates of a tool or machining table in respective axes in the CNC equipment and outputting of the current actual feedrate of the tool or the machining table.

BACKGROUND ART

FIG. 2 is a schematic block diagram of conventional CNC equipment.

In FIG. 2 reference numeral 1 indicates a microprocessor unit (MPU), which controls the operation of the entire equipment and is connected to respective sections via a bus 2 including an address bus, a data bus and a control bus. Programs necessary for the MPU 1 to perform predetermined functions are stored in a read-only memory (ROM) 3 and machining programs necessary for NC machining are stored in the form of a punched tape or memory in an external storage 4. The MPU 1 reads these data via the bus 2 and controls a first axis servo system 51, a second axis servo system 52, . . . to thereby perform required NC machining.

For example, in the first axis servo system 51, a position command issued from the MPU 1 for a first axis is provided via the bus 2 to a first axis position control circuit 61. The first axis position control circuit 61 responds to the position command to generate a feedrate command signal for a first axis motor 71. The first axis motor 71 rotates on the basis of the feedrate command, shifting the position of a tool or machining table in the first axis. The amount of change in the position of the tool or machining table thus moved is fed back to the first axis position control circuit 61, which effects control so that a residual error in position in the first axis is held at a predetermined value, thereby performing position control in the first axis.

Position control in a second axis in the second axis servo system 52 is also effected in exactly the same manner as described above.

With such conventional CNC equipment as depicted in FIG. 2, control in each axis is performed independently in response to a position command, but the traveling speed or feedrate in each axis in this case cannot be known, so that it is impossible to obtain an output indicating the actual feedrate of the machining table.

On the other hand, conventional laser machining under NC control employs a fixed beam intensity in many cases; therefore, when the feedrate of the machining table is low, the machining energy per unit area increases and large holes are drilled, whereas when the feedrate of the table is high, holes machined are small. Accordingly, holes of a fixed size cannot be obtained.

It is therefore desirable that holes can be made in a fixed size by controlling the beam intensity in accordance with the feedrate of the machining table, but the conventional CNC equipment cannot provide the feedrate of the machining table as mentioned above, and hence is incapable of controlling the beam intensity.

SUMMARY OF THE INVENTION

To solve the above problems, according to the axis feedrate output system of the present invention for CNC equipment which controls the position of a machining table in each axis by effecting feedrate control in accordance with a residual error between a position command and detected positional information, there are provided means for obtaining the current feedrate in each axis from the residual error, means for obtaining the current feedrate of the machining table by synthesizing its current feedrates in respective axes and means for generating an output representing the current feedrate of the machining table by a ratio to a predetermined maximum feedrate.

The residual error (or servo error) between the position command for each axis from the CNC equipment and the positional information detected by a position sensor is held in an error register, from which is generated a feedrate command for effecting feedrate control. The residual error and the current feedrate in each axis bear a fixed relation, which is used to obtain the current feedrate in each axis from the residual error. The actual feedrate of the machining table can be obtained by synthesizing its current feedrates in the respective axes. The actual feedrate of the machining table thus obtained is converted to an output based on a ratio of the factual feedrate to a maximum feedrate in the system which is set by a parameter.

DESCRIPTION OF THE PREFERRED EMBODIMENT

Figure 1:
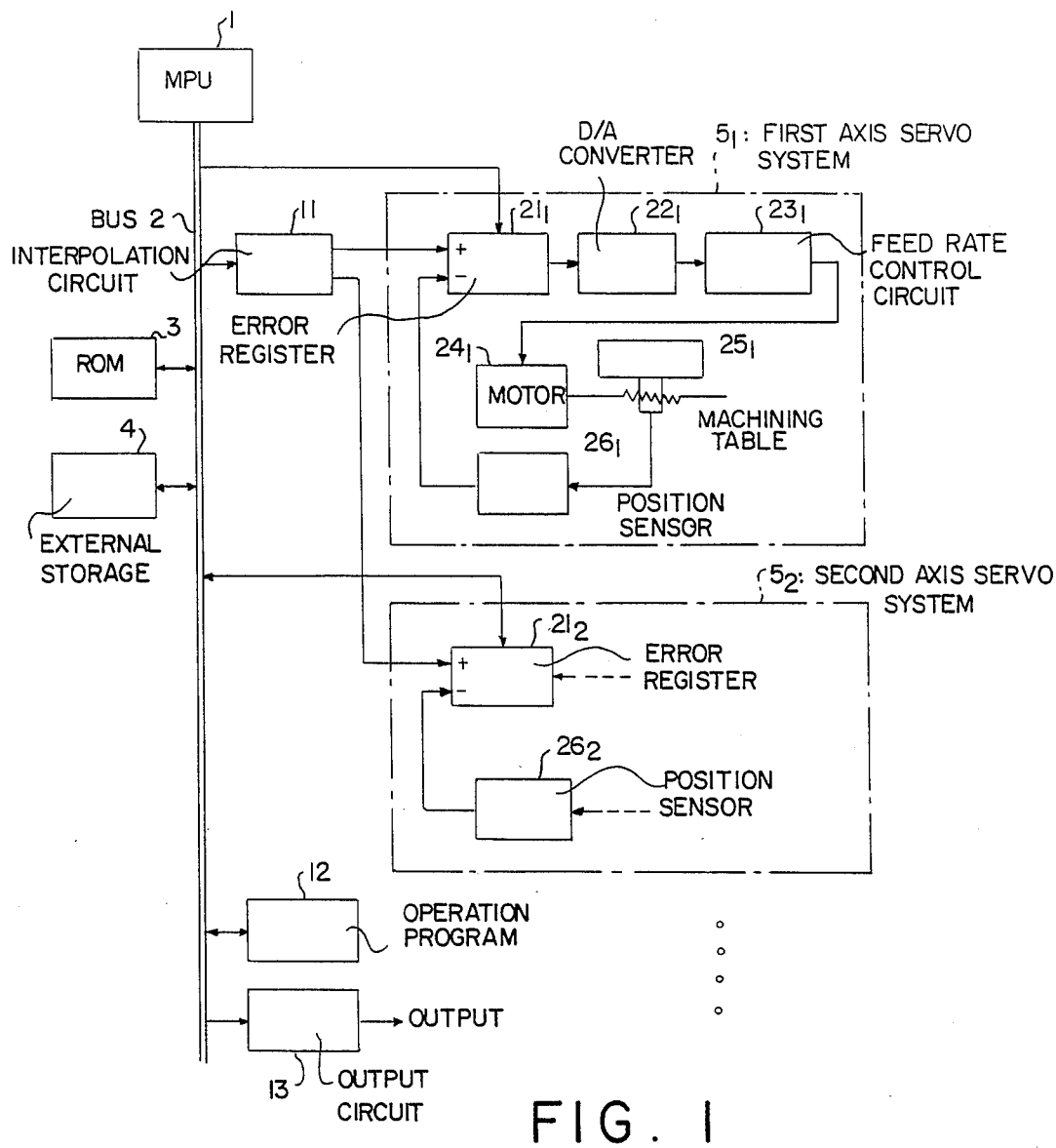
FIG. 1 is a block diagram illustrating the arrangement of an embodiment of the present invention.
Figure 2:
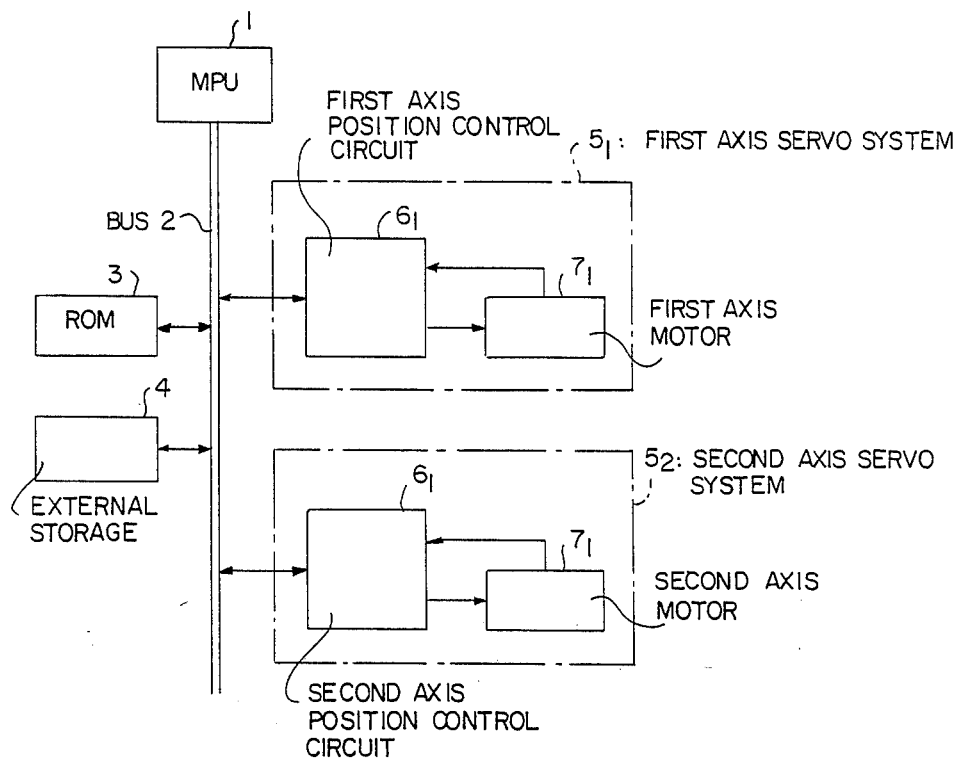
FIG. 2 is a block diagram of conventional CNC equipment.

FIG. 1 illustrates in block form an embodiment of the present invention, in which the parts corresponding to those in FIG. 2 are identified by the same reference numerals. Reference numeral 11 indicates an interpolation circuit, 12 an operation program and 13 an output circuit. In the respective axis servo systems $5_1, 5_2, \ldots$ reference numerals $21_1, 21_2, \ldots$ designate error registers, $22_1, 22_2, \ldots$ digital-to-analog (D/A) converters, $23_1, 23_2, \ldots$ feedrate control circuits, $24_1, 24_2, \ldots$ motors, $25_1, 25_2, \ldots$ machining tables and $26_1, 26_2, \ldots$ position sensors. The second axis servo system $5_2$ and other servo systems, except the first axis one, are shown with their internal arrangements omitted.

In FIG. 1, for example, the first axis servo system $5_1$ is controlled in the following manner:

The MPU 1 outputs via the bus 2 a position command for the first axis, which command is provided in the form of a distance over which the machining table is to be fed, with respect to the residual error held in the error register $21_1$. The interpolation circuit 11 generates, as command pulses, interpolated output pulses corresponding to the distance information. That is, the number of interpolated output pulses in this instance corresponds to the number of pulses from the position sensor $26_1$ during a minimum detection unit (1 μm, for example).

The error register $21_1$ has the function of an updown counter and counts upward with the interpolated output pulses. The D/A converter $22_1$ outputs the contents of the error register $21_1$ after conversion into analog form. The feedrate control circuit $23_1$ converts the analog positional information to a feedrate signal for the motor $24_1$. The motor $24_1$ rotates accordingly, feeding the machining table $25_1$ at the specified feedrate. The position sensor $26_1$ provides feedback pulses for each minimum detection unit (1 μm) in response to positional changes of the machining table $25_1$.

The error register $21_1$ counts down with the feedback pulses, and accordingly, the positional residual error is always held as the number of pulses in the error register $21_1$.

It is known that in such a system, letting the residual error (a servo error) in the error register $21_1$ be represented by $E_1$, the servo error $E_1$ and the feedrate $F_1$ (mm/sec) bear the following relationship:

$$E_1 = \frac{F_1}{G} \times \frac{1}{\alpha} \quad (1)$$

where G is the gain (sec$^{-1}$) of the system and $\alpha$ is the minimum detection unit (1 μm). Accordingly, when the servo error in the error register is known, the feedrate $F_1$ can be obtained from the relationship of Eq. (1).

The same is true of the second axis servo system $5_2$. Based on a servo error $E_2$ in the error register $21_2$, the feedrate $F_2$ (mm/sec) in the second axis can be obtained from the following relation:

$$E_2 = \frac{F_2}{G} \times \frac{1}{\alpha} \quad (2)$$

Now, consider the case of two axes. Letting the feedrates in first and second axes be represented by $F_1$ and $F_2$, the synthetic feedrate F of the machining table is given as follows:

$$F = \frac{\sqrt{F_1^2 + F_2^2}}{F\text{max}} \times 2^n \quad (3)$$

where Fmax is a maximum feedrate (mm/sec) in the system which is set by a parameter, and it is equal to a quick feedrate. $2^n$ is a maximum feedrate represented by an n-bit binary signal.

Rewriting the synthetic feedrate F in terms of the servo errors $E_1$ and $E_2$ from Eqs. (1), (2) and (3), it follows that $$F = \frac{\sqrt{E_1^2 + E_2^2}}{E_3} \times 2^n \quad (4)$$

where $E_3$ is a servo error corresponding to the maximum feedrate Fmax and can be obtained from the following equation:

$$E_3 = \frac{F\text{max}}{G} \times \frac{1}{\alpha} \quad (5)$$

In FIG. 1, the MPU 1 computes the synthetic feedrate F by performing the operations of Eqs. (4) and (5) using the current values (servo errors) held in the error registers $21_1$, $21_2$, . . . through use of the operation program 12. The synthetic feedrate F thus obtained is provided via the output circuit 13 to an external device. The synthetic feedrate in this instance is provided as a ratio to the maximum feedrate Fmax, based on Eq. (4).

As described above, according to the present invention, by performing operations based on residual errors (servo errors) in the error registers of servo systems of respective axes in the CNC equipment, it is possible to obtain the actual feedrate of the machining table and output a signal representing it.

Accordingly, the present invention is of great utility when employed in the case of controlling the beam intensity in accordance with the actual feedrate of the machining table in laser machining with the CNC equipment.

We claim:

1. An axis feedrate output system for computer numerical control equipment which controls the position of a tool or machining table along a plurality of axes by effecting feedrate control in accordance with a residual error between a position command and detected position, comprising:
   means for obtaining a current feedrate of the tool or machining table for each of the plurality of axes using the residual error;
   means for obtaining a current actual feedrate of the tool or machining table based on said current feedrate for each of said axes; and
   means for generating an output which represents said current actual feedrate of the tool or machining table as a ratio of said current actual feedrate to a predetermined maximum feedrate.

2. An axis feedrate output system for controlling the position of an element along a plurality of axes, comprising:
   means for receiving a position command;
   means for detecting the position of the element along each of the plurality of axes;
   means for determining a residual error for each of the plurality of axes using the position command and the detected position of the element along each of the plurality of axes;
   means for determining respective current feedrates of the element along corresponding ones of the plurality of axes based on the respective residual errors for the corresponding ones of the axes;
   means for determining a synthetic feedrate of the element using the respective current feedrates; and
   output means for generating an output signal responsive to said synthetic feedrate.

3. An axis output system according to claim 2, wherein said output means includes means for providing said output signal in accordance with a maximum feedrate.

* * * * *